United States Patent
Liu et al.

(10) Patent No.: US 8,096,123 B2
(45) Date of Patent: Jan. 17, 2012

(54) SYSTEM AND METHOD FOR MODE TRANSITION FOR A TWO-STAGE SERIES SEQUENTIAL TURBOCHARGER

(75) Inventors: Zhiping Liu, Canton, MI (US); Ping Ge, Northville Township, MI (US); Anupam Gangopadhyay, Chennai (IN)

(73) Assignee: GM Global Technology Operations LLC

( * ) Notice: Subject to any disclaimer, the term of this patent is extended or adjusted under 35 U.S.C. 154(b) by 400 days.

(21) Appl. No.: 12/474,599

(22) Filed: May 29, 2009

(65) Prior Publication Data

US 2010/0300087 A1    Dec. 2, 2010

(51) Int. Cl.
*F02B 33/44* (2006.01)

(52) U.S. Cl. .......................... 60/605.1; 60/599; 60/602

(58) Field of Classification Search .................. 60/599, 60/602, 612, 605.1, 605.2
See application file for complete search history.

(56) References Cited

U.S. PATENT DOCUMENTS

| | | | |
|---|---|---|---|
| 2004/0134193 A1* | 7/2004 | Klingel | 60/612 |
| 2005/0056017 A1* | 3/2005 | Sisken et al. | 60/605.2 |
| 2005/0103014 A1* | 5/2005 | Sasaki | 60/605.2 |
| 2005/0109029 A1* | 5/2005 | Busch | 60/605.1 |
| 2006/0021347 A1* | 2/2006 | Sun et al. | 60/612 |
| 2006/0042246 A1* | 3/2006 | Gray et al. | 60/612 |
| 2006/0059910 A1* | 3/2006 | Spaeder et al. | 60/612 |
| 2006/0123786 A1* | 6/2006 | Gobert et al. | 60/612 |
| 2007/0056283 A1* | 3/2007 | Klingel | 60/612 |
| 2007/0062188 A1* | 3/2007 | Fry et al. | 60/599 |
| 2007/0079612 A1* | 4/2007 | Grissom | 60/602 |
| 2007/0119172 A1* | 5/2007 | Barbe et al. | 60/605.2 |
| 2007/0169479 A1* | 7/2007 | Nicolle et al. | 60/612 |

* cited by examiner

*Primary Examiner* — Thanh Lam

(57) ABSTRACT

A method of controlling a series turbocharger for an engine and a control system for the same includes a boost determination module determining a first predicted boost pressure for a first position of a variable geometry turbine when a high pressure turbine bypass valve is in an open position. The boost determination module determines a second boost pressure for a second position of the variable geometry when the high pressure turbine bypass valve is in the open position. A desired boost module determines a desired boost. A comparison module determines when the desired boost signal is between the first predicted boost pressure and the second predicted boost pressure. A bypass valve control module closes the high pressure turbine bypass valve when the desired boost signal is between the first predicted boost pressure and the second predicted boost pressure.

20 Claims, 6 Drawing Sheets

SYSTEM AND METHOD FOR MODE TRANSITION FOR A TWO-STAGE SERIES SEQUENTIAL TURBOCHARGER

FIELD

The present disclosure relates to internal combustion engines, and more particularly to systems and methods for controlling a sequential two-stage turbocharger of the internal combustion engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Increasing fuel economy is a desirable goal for auto manufacturers. Consumers desire high fuel economy without sacrificing performance. Turbocharging provides a method for increasing performance during demanding conditions while reducing the overall fuel economy of the vehicle since a smaller displacement engine can be used.

One type of turbocharging system is a two-stage series sequential turbocharger. In such a two-stage system, a high-pressure turbine and a low-pressure turbine are provided in-series. When the engine is working at high load or high speed or both, the turbocharging system may use only the low-pressure turbine while bypassing the high-pressure turbine. This mode will be referred to as Mode A.

When the engine load and speed are not high, the high-pressure turbine and low-pressure turbine work together in-series. This is referred to as Mode B.

Providing a smooth transition between modes A and B is important for drivability of the vehicle. Providing a calibration for switching between the modes may be performed. However, the switch condition may be based upon fuel load, engine speed or other conditions. Such a calibration effort may be extremely large and thus costly. A calibration may only be valid for one-configuration subsystems. Therefore, if one of the subsystems is changed, the entire calibration would have to be repeated. Further, due to tolerances of parts, the calibration may not be optimum due to tolerances, aging of the parts and other unforeseen conditions.

SUMMARY

Accordingly, the present disclosure provides a system and method for transitioning smoothly between the low-pressure turbine operation and the operation of the series combination of the high-pressure turbine and low-pressure turbine.

In one aspect of the disclosure, a method for controlling an engine with a turbocharging system with a high pressure turbocharger and a low pressure turbocharger includes determining a potential boost pressure corresponding to a high pressure turbine bypass valve in a closed position when it is in an large open position and closing the bypass valve so a high pressure compressor operates with the potential boost pressure in a desired high pressure working area so that a desired pressure boost is obtained, and maintaining the high pressure turbine bypass valve in an open position.

In a further aspect of the disclosure, a method of controlling an engine includes opening the high pressure turbine bypass valve of a turbocharging system, for a first position of a variable geometry turbine, determining a first predicted boost pressure when the high pressure turbine bypass valve is in an open position, for a second position of the variable geometry, determining a second boost pressure when the high pressure turbine bypass valve is in the open position, determining a desired boost and when the desired boost signal is between the first predicted boost pressure and the second predicted boost pressure, closing the high pressure turbine bypass valve.

In yet another aspect of the disclosure, a control system includes a boost determination module determining a first predicted boost pressure when the high pressure turbine bypass valve is in an open position for a first position of a variable geometry turbine when a high pressure turbine bypass valve is in a closed position. The boost determination module determines a second boost pressure when the high pressure turbine bypass valve is in the open position for a second position of the variable geometry when the high pressure turbine bypass valve is in the closed position. A desired boost module determines a desired boost. A comparison module determines when the desired boost signal is between the first predicted boost pressure and the second predicted boost pressure. A bypass valve control module closes the high pressure turbine bypass valve when the desired boost signal is between the first predicted boost pressure and the second predicted boost pressure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

Figure 1:
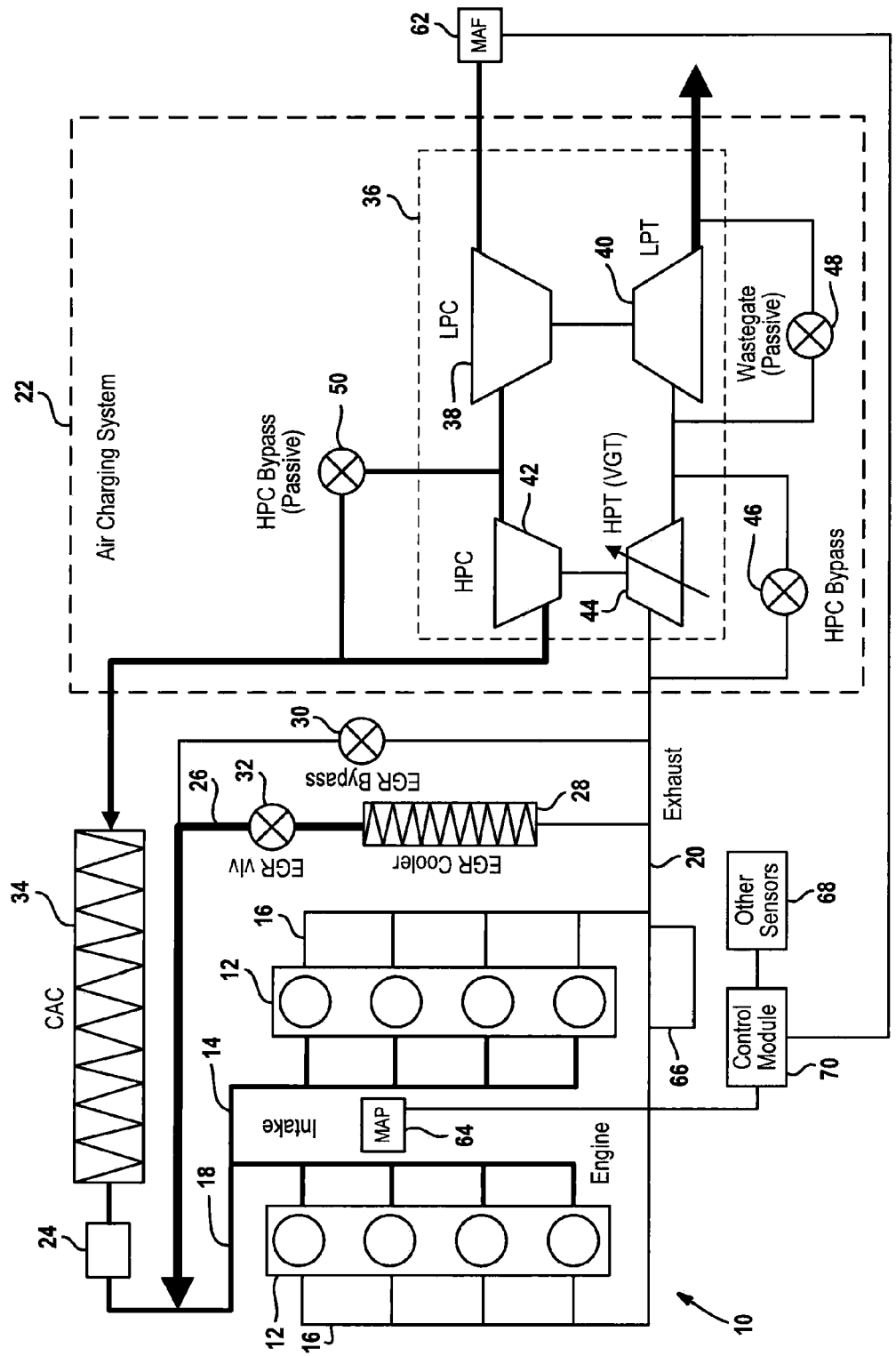
FIG. 1 is a functional block diagram of an engine system including a charging system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine 10 includes a cylinder block 12 having various number of cylinders, an intake manifold 14 and an exhaust manifold or manifolds 16. The intake manifold includes an air inlet 18. The exhaust manifold 16 has an exhaust outlet 20. The engine 10 is in communication with an air charging system 22. The charging system 22 may be a two-stage series sequential turbocharger. The inlet throttle 24 may be a blade or butterfly-type inlet throttle. A barrel-type throttle may also be used. The inlet throttle 24 is a valve that has an opening area that may be increased or decreased according to a control system and method as will be described below.

An exhaust gas recirculation (EGR) valve 32 controls exhaust gas flow for emission reduction from the exhaust outlet 20 to the inlet 18. The EGR valve 32 also has a controllable opening area that can be increased or decreased according to a control system and method. The inlet airflow from the EGR valve 32 and the inlet throttle 24 combine to form a total inlet airflow into the engine 10.

The exhaust gas recirculation valve may be in-series with an exhaust gas recirculation cooler 28. An EGR bypass valve 30 may be used to bypass the EGR valve 32 and the EGR cooler 28. The EGR bypass valve 30 is in parallel to the series combination of the EGR valve 32 and the EGR cooler 28.

The charging system 22 has an outlet that is provided to a charge air cooler (CAC) 34. The charge cooler 34 cools the inlet airflow prior to the intake manifold 14. The charging system 22, as mentioned above, may include a two-stage series sequential turbo charger 36. The two-stage series sequential turbo charger 36 may include a low-pressure compressor 38 that is directly coupled to a low-pressure turbine 40. The two-stage series sequential turbo charger 36 may also include a high-pressure compressor 42 in direct communication with a high-pressure turbine 44. The high-pressure turbine 44 may be a variable geometry turbine. The low-pressure turbine 40 may be a fixed geometry turbine. Both turbines 40, 44 are driven by exhaust gases from the exhaust outlet 20.

A high-pressure turbine bypass valve 46 may be used to bypass the high-pressure turbine 44. By opening the valve, the high-pressure turbine is essentially bypassed. In the closed position, the bypass valve 46 forces exhaust gases through the high-pressure turbine 44. A waste gate 48 may be used to bypass the low-pressure turbine 40. Typically, the waste gate 48 will operate only under extreme pressure conditions as a safety. The high-pressure compressor 42 and the low-pressure compressor 38 are used to compress intake air from the LPC inlet. A bypass valve 50 disposed between the low-pressure compressor 38 outlet and the high-pressure compressor 42 outlet is used to bypass the high-pressure compressor. Air traveling through the bypass valve 50 exits the charging system 22 and is provided to the charge air cooler 34.

A mass airflow sensor 62 generates a mass airflow signal corresponding to the mass of air in the intake of the system.

A manifold absolute pressure sensor 64 disposed within the intake manifold 14 generates a manifold pressure signal. The manifold absolute pressure signal may be used to determine the pressure ratio of the charging system.

An exhaust manifold pressure sensor 66 may generate a pressure signal corresponding to the pressure of exhaust gasses in the exhaust manifold. The exhaust manifold pressure may also be derived from other sensors 68 typically found on an engine. The other sensors 68 may include an engine speed sensor, a requested fuel quantity signal, a requested injection timing signal, an intake manifold temperature sensor and an engine coolant temperature sensor. For simplicity, the other sensors are all illustrated in the other sensor block 68.

A control module 70 is in communication with the mass airflow sensor 62, the manifold absolute pressure 64, the exhaust manifold pressure sensor 66, the EGR valve 32, the bypass valve 46 and the inlet throttle 24. As will be described below, the control module 70 independently controls the bypass valve 46 and the inlet throttle 24.

Figure 2:
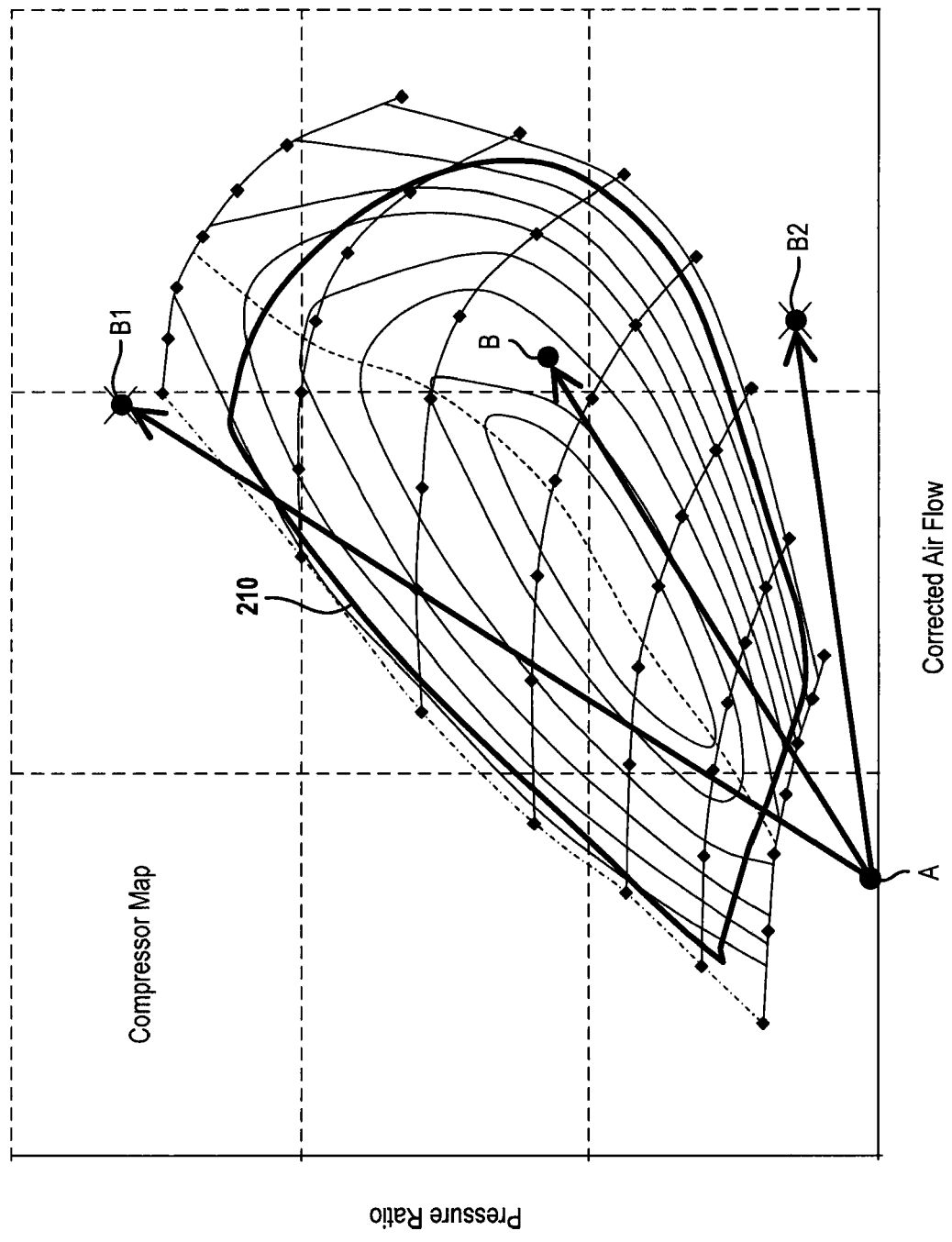
FIG. 2 is a compressor map illustrating a pressure ratio and corrected airflow ratio for the high-pressure compressor.

Referring now to FIG. 2, a compressor map having a plot of pressure ratio versus the corrected airflow is illustrated. The present disclosure provides a smooth transition from Mode A in which the pressure boost is generated only by the low-pressure compressor and Mode B in which the pressure boost is generated by the high-pressure compressor in-series with the low-pressure compressor. When the turbocharger is working in Mode A, the high-pressure turbine bypass valve 46 of FIG. 1 is in a large open position and the high-pressure compressor bypass valve 50 is fully open. The variable geometry turbine of the high-pressure turbine 44 and the high-pressure compressor are working in idle mode.

As the engine speed and load are decreasing, the high-pressure turbine bypass valve closes so the turbine goes back to Mode B. In the present disclosure, a prediction is performed so that when the high-pressure turbine bypass valve 46 is closed and the high-pressure compressor starts generating boost, the high-pressure compressor is working inside a desired compressor working area 210. Then, when the high-pressure turbine bypass valve 46 is closed, point B is considered an acceptable destination point and points B1 and B2 are not considered acceptable points since the high-pressure compressor would be working in a very low efficiency area, in a choking area, surging area or an over-speeding area. If the high-pressure compressor is not working in the desired area 210 after the bypass valve is closed, adjustments are required. The high-pressure turbine bypass valve will try to reopen and a back-and-forth transition may not be acceptable for performance or emissions.

As is set forth below, the present disclosure uses a model which uses an energy balancing concept to calculate the would-be or potential boost pressure when the high-pressure turbine bypass valve 46 was closed. When the high-pressure turbine bypass valve 46 is in a fully- or largely-opened position, the model calculates the potential boost pressure, assuming the high-pressure turbine bypass valve 46 was closed and the variable geometry turbine position is within a predefined range. When the model finds that the high-pressure turbine bypass valve was closed, a reasonable variable geometry turbine position would bring the boost pressure back to the desired value and the high-pressure compressor would operate in a desired area, then the high-pressure turbine bypass valve may be ready to be closed. If the above conditions are not met, the method will not allow the high-pressure turbine bypass valve 46 to close until a switching condition is met.

Figure 3:
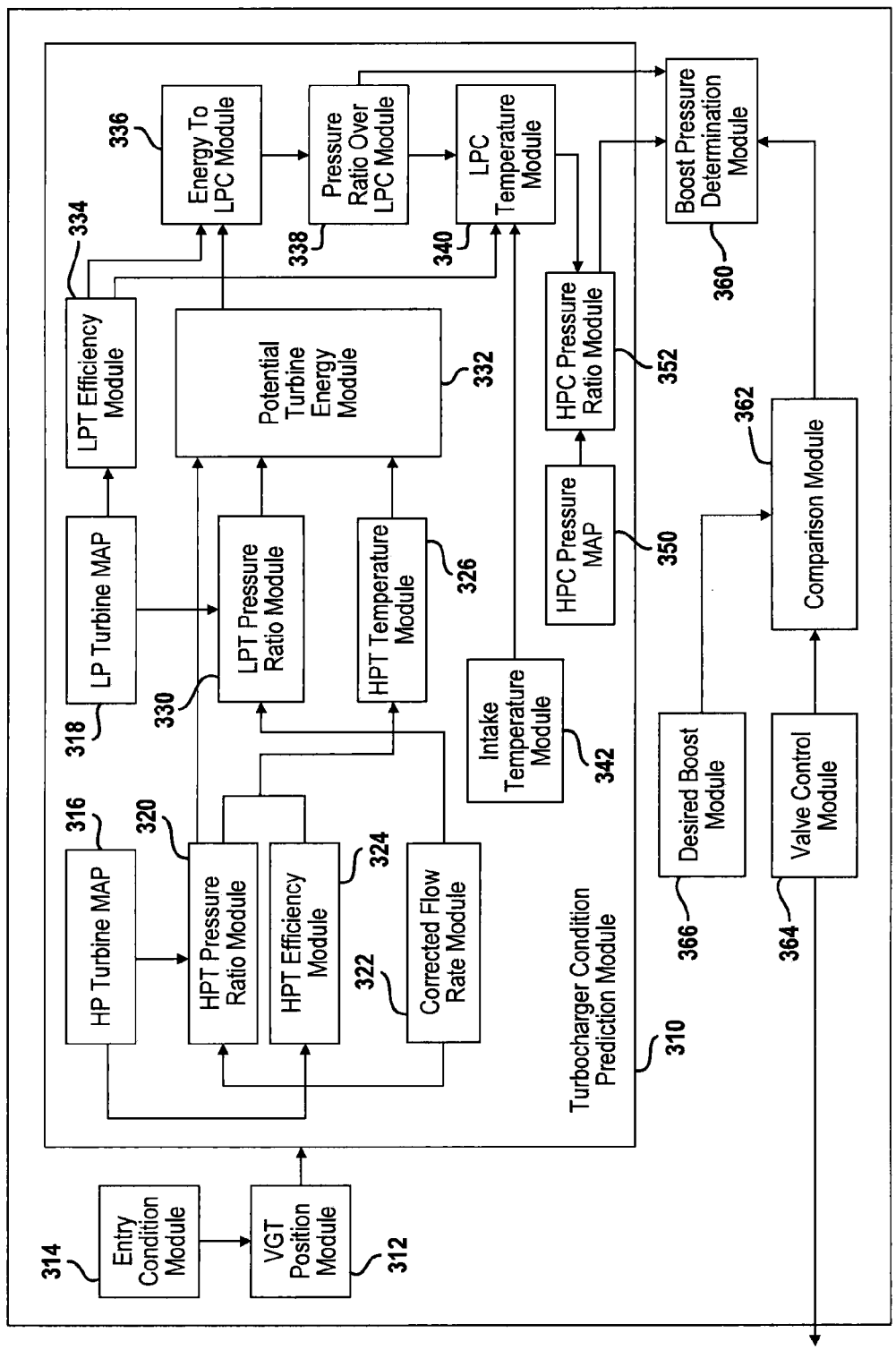
FIG. 3 is a functional block diagram of the controller of FIG. 1.

Referring now to FIG. 3, the control module 70 is illustrated in further detail. A turbocharger condition prediction module 310 predicts the conditions for the high-pressure and low-pressure turbo chargers to determine when to open the bypass valve 46 of FIG. 1. The turbocharger condition prediction module 310 is performed for a variable geometry turbine (VGT). The determinations made in the turbocharger condition prediction module 310 are performed at different variable geometry turbine positions and thus a variable geometry turbine position module 312 allows different turbine positions to be tested. In this embodiment, a maximum variable geometry turbine position and a minimum variable geometry turbine position are used. An entry condition module 314 determines the entry condition of the system. The entry condition module 314 may, for example, determine the position of the high-pressure turbine bypass valve 46 of FIG. 1. The present example is set forth for transitioning from Mode A to Mode B which is a transition from the low-pressure turbine acting alone to the low-pressure turbine and high-pressure turbine acting in-series.

The turbocharger condition prediction module 310 may include a high-pressure turbine map 316 and a low-pressure turbine map 318. The high-pressure turbine map and the low-pressure turbine map may correlate the pressure ratios and airflows of the low-pressure turbine and high-pressure turbine, respectively. The pressure ratio is the ratio of the inlet pressure and the outlet pressure of the turbine.

A high-pressure turbine pressure ratio module 320 determines the high-pressure turbine pressure ratio using the high-pressure turbine ratio map and the variable geometry turbine position. A corrected flow rate signal from a corrected flow rate module 322 may also be used in the high-pressure turbine pressure ratio module.

A high-pressure turbine efficiency module 324 determines the high-pressure turbine efficiency using the high-pressure turbine map and the variable geometry turbine position.

A temperature drop module 326 determines the high-pressure turbine temperature drop over the high-pressure turbine. The high-pressure turbine outlet temperature is a function of the pressure ratio from the high-pressure turbine pressure ratio module 320, the high-pressure turbine inlet temperature and the turbine efficiency from the high-pressure turbine efficiency module 324.

A low-pressure turbine pressure ratio module 330 uses the low-pressure turbine map 318 to calculate the pressure ratio over the low-pressure turbine. The output of the corrected flow rate module 322 is also used in this determination. The temperature drop over the high-pressure turbine module is the inlet temperature drop to the low-pressure turbine. The temperature is provided to a potential turbine energy module 332 that determines the potential turbine energy of both the low-pressure turbine and the high-pressure turbine. The potential turbine energy module 332 receives a high-pressure turbine pressure ratio signal from the high-pressure turbine pressure ratio module 320 and a low-pressure turbine pressure ratio signal from the low-pressure turbine pressure ratio module 330. The exhaust temperatures, pressures and flow information are used to determine the potential high-pressure turbine and low-pressure turbine energy. That is, when the potential turbine energy for both the high-pressure turbine and the low-pressure turbine are determined, a switch from Mode A (low-pressure turbine alone) to Mode B (both high-pressure turbine and low-pressure turbine) should occur.

A low-pressure turbine efficiency module 334 generates a low-pressure turbine efficiency based upon the low-pressure turbine map 318.

An energy to the low-pass compressor module 336 generates an energy signal corresponding to the energy that is transferred to the low-pressure compressor based upon the low-pressure turbine efficiency module signal 334 and the energy that can be provided by the low-pressure turbine.

A pressure ratio over the low-pressure compressor module 338 generates a pressure ratio corresponding to the pressure ratio over the low-pass compressor. The energy signal from low-pass compressor module 336 is used to determine the pressure ratio of the low-pass compressor.

A low-pressure compressor outlet temperature determination module 340 determines the outlet temperature of the low-pressure compressor based upon the low-pressure compressor inlet temperature which may be obtained from the intake temperature module 342. A sensor may be used to determine the inlet temperature to the vehicle. The pressure ratio determined in signal from block 338 and the efficiency signal from the low-pressure temperature or turbine efficiency module 334 may be used in the determination.

A high-pressure compressor pressure map 350 may be used in conjunction with a high-pressure compressor pressure ratio module 352 to generate a high-pressure compressor pressure ratio. Both the high-pressure compressor and low-pressure compressor pressure ratios may be calculated at a variable geometry turbine maximum position and a variable geometry turbine minimum position. A boost pressure determination module 360 may be used to determine the maximum and minimum boost pressures using the variable geometry turbine positions.

A comparison module 362 compares various parameters to determine whether or not the valve should remain open or is ready to close using the valve control module 364. The comparison is made in the comparison module 362. The comparisons made in the comparison module 362 may determine whether the desired boost pressure from a desired boost pressure module 366 is within the range of the maximum boost and the minimum boost determined in the boost pressure determination module 360. When the desired boost pressure is within the range of the maximum and minimum boost at the two extreme positions and there is an overlap between the desired high-pressure compressor working area and the maximum and minimum high-pressure compressor pressure ratios under the maximum and minimum variable geometry turbine positions, the bypass valve 46 illustrated in FIG. 1 is ready to be closed. If either of the above-mentioned comparisons is not true, the valve is not ready to open.

Figure 4A:
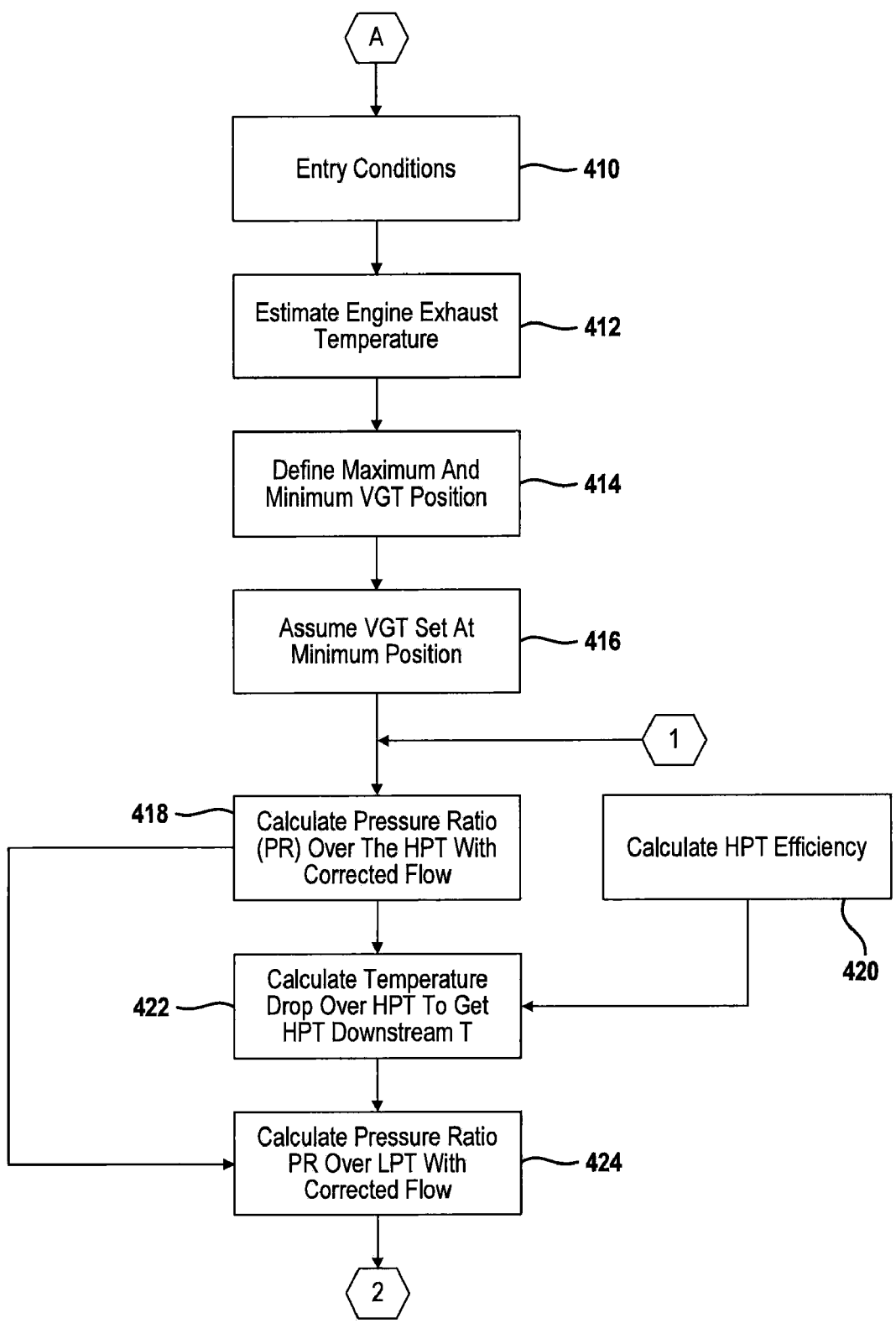
FIGS. 4*a*-4*c* are a flowchart illustrating steps executed by the system according to the present disclosure.
Figure 4B:
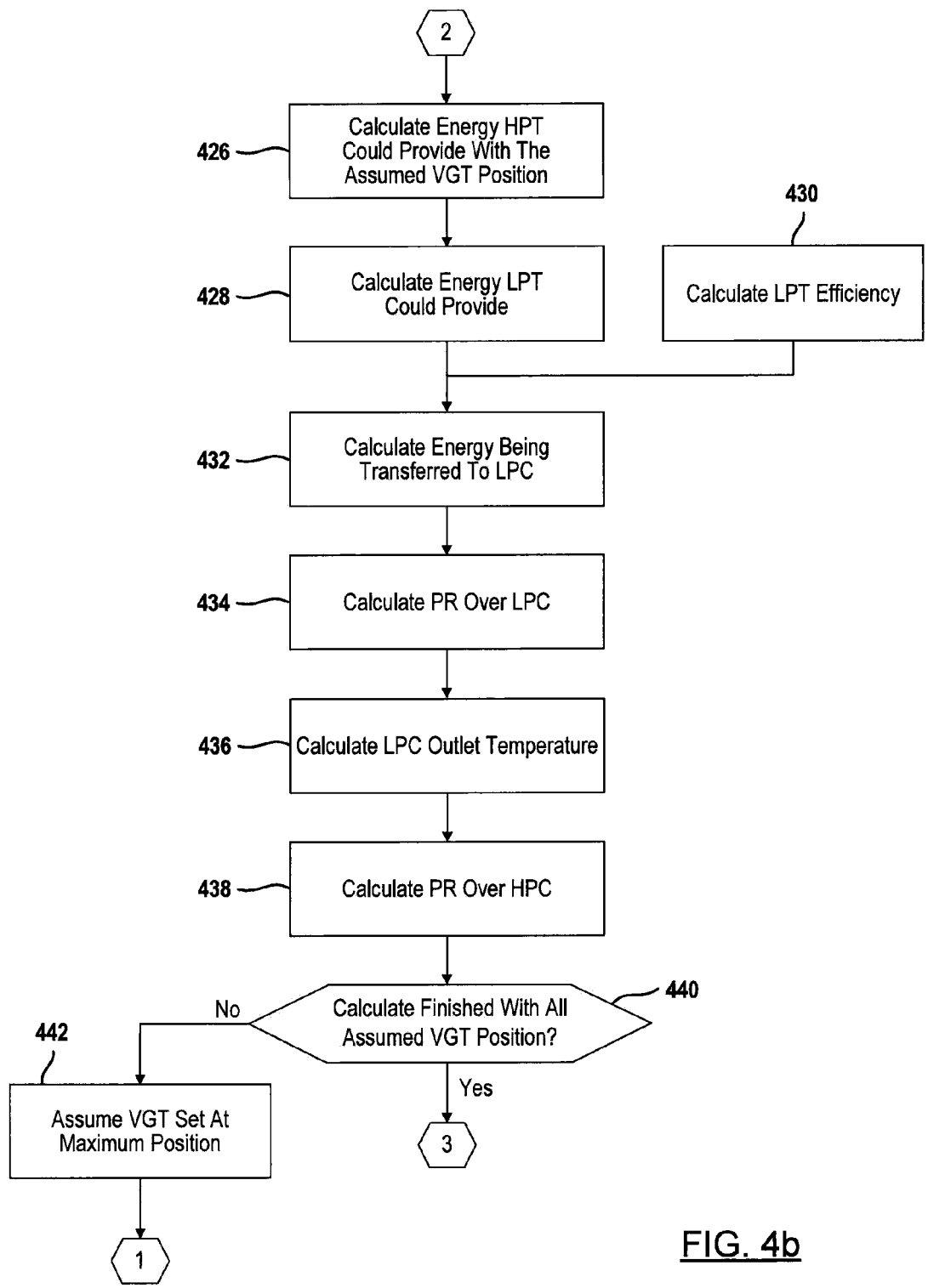
Figure 4C:
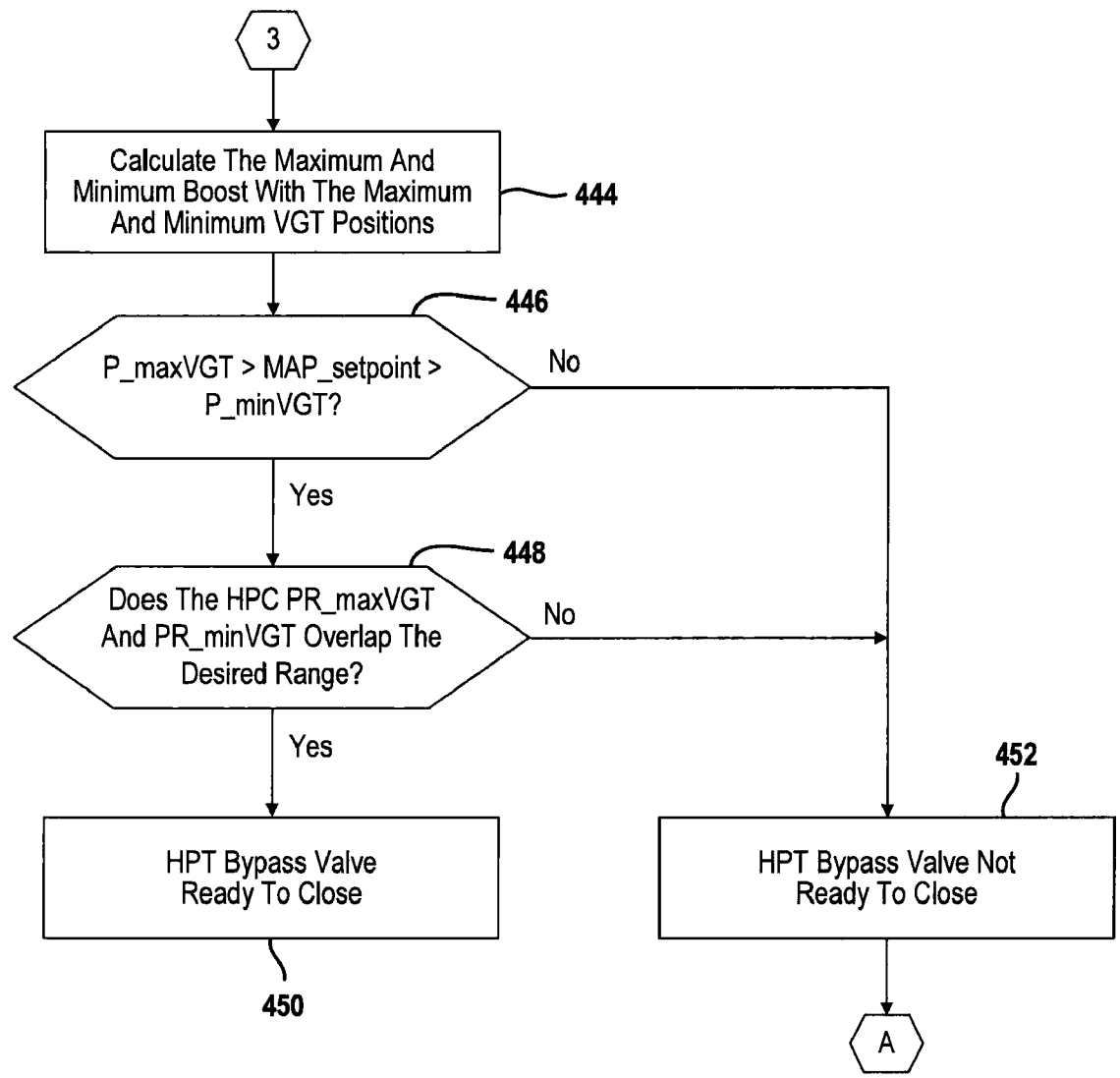

Referring now to FIGS. 4a-4c, a method for operating the present disclosure is set forth. In step 410, entry conditions are determined. In this example, the entry conditions are when the high-pressure turbine bypass valve is in an open position and the high-pressure compressor bypass valve is open. The present disclosure determines whether the high-pressure turbine bypass valve 46 of FIG. 1 is ready to close. When determining whether the high-pressure turbine bypass valve is in an open position, the position may be referred to as a "large" open position when the open position is fully open or nearly fully open. Greater than about 75% may be considered a large open position.

In step 412, the engine exhaust temperature is estimated. The exhaust temperature is the exhaust manifold temperature which is used for calculating the turbine energy and the corrected exhaust gas flow rate as will be described below. The engine exhaust temperature may be calculated from a model using various parameters. Of course, a direct measurement of the exhaust manifold temperature may be determined using a sensor. Using a model, other sensors associated with the engine are used. For example, an engine speed sensor, a requested fuel quantity, a requested injection timing, an intake manifold temperature sensor, an air mass flow sensor, and an engine coolant temperature may be used together in combination or subcombination to determine the exhaust manifold temperature.

In step 414, a maximum and minimum variable geometry turbine position is defined. The positions are used to calculate two possible boost pressures when the high-pressure turbine bypass valve 46 is closed. If the desired boost pressure is between the two pressures and the high-pressure compressor ratios within the two variable geometry positions overlap the working area 210 illustrated in FIG. 2, the bypass valve will be allowed to close. In step 416, the VGT position is presumed to be at a minimum position. The following calculations will also be performed for a maximum position. In step 418, a pressure ratio over the high-pressure turbine with a corrected flow rate is determined. The high-pressure turbine map and the vane geometry turbine position are used in calculating the pressure ratio. A corrected flow rate is used in the calculation.

In step 420, the high-pressure turbine efficiency is determined using the high-pressure turbine map and the variable geometry turbine position. The pressure ratio over the high-pressure turbine from step 418 and the high-pressure turbine efficiency from step 420 are used to calculate the temperature drop over the high-pressure turbine so that the downstream temperature of the high-pressure turbine may be determined in step 422. The high-pressure turbine outlet temperature is a function of the pressure ratio, the high-pressure turbine inlet temperature and turbine efficiency. In step 424, the low-pressure turbine map is used to calculate the pressure ratio over the low-pressure turbine. A corrected flow rate is also used in step 424.

In step 426, the energy that may be provided by the high-pressure turbine with the presumed variable geometry turbine position is calculated. This is performed using the above temperature, pressure and flow as well as an energy equation to calculate the energy. The exhaust temperature, pressure, flow and energy equation are used to calculate the energy that the low-pressure turbine could provide. In step 430, a low-pressure turbine map is used to calculate the low-pressure turbine efficiency. In step 432, the energy from the low-pressure turbine and the efficiency of the low-pressure turbine determined in steps 428 and 430 are used to calculate the energy being transferred to the low-pressure compressor in step 432. In step 434, the pressure ratio over the low-pressure compressor is determined using the energy obtained from the low-pressure turbine. In step 436, the low-pressure compressor outlet temperature based upon the low-pressure compressor inlet temperature, pressure ratio and efficiency is determined. In step 438, the corrected flow and the high-pressure compressor map is used to calculate the pressure ratio over the high-pressure compressor.

In step 440, it is determined whether or not the process is finished with all the variable geometry turbine positions. In step 442, when all the calculations in step 440 are not finished, the method determines calculations for the variable geometry turbine set at a maximum valve position. Steps 418 through 438 are then calculated for the maximum position which is contrasted by the variable geometry turbine minimum positions performed previously.

In step 440, when the calculations for all the variable geometry turbine positions are completed, step 444 is performed. In step 444, the maximum and minimum boost pressures with the variable geometry turbine positions at maximum and minimum positions are calculated.

In step 446, it is determined whether or not the desired boost pressure is within the range of the maximum boost and the minimum boost within the two extreme variable geometry positions. If the desired boost is within the range with a maximum boost and minimum boost of the two extreme positions, step 448 determines whether there is an overlap between the high-pressure compressor working area and the maximum and minimum high-pressure compressor pressure ratios under the maximum and minimum variable geometry turbine positions. In other words, when the high-pressure turbine bypass valve is closed, is there a feasible variable geometry turbine position to make the high-pressure compressor work in the desired work area 210 illustrated in FIG. 2. If so, step 450 closes the bypass valve.

Referring back to steps 446 and 448, when the desired boost pressure is not within the range of the maximum boost and minimum boost of the two extreme variable geometry turbine positions, step 452 does not allow the high-pressure turbine bypass valve to close. Also, step 448 determines when the high-pressure turbine bypass valve may be closed, if there is no feasible variable geometry turbine position to make the high-pressure compressor work in the desired work area 210 of FIG. 2, step 452 does not allow the bypass valve to close.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method for controlling an engine including a turbocharging system with a high pressure turbocharger and a low pressure turbocharger, comprising:
   determining a potential boost pressure corresponding to a high pressure turbine bypass valve in a closed position when the high pressure turbine bypass valve is in an open position; and
   closing high pressure turbine the bypass valve and operating a high pressure compressor with the potential boost pressure in a desired high pressure working area to obtain a desired pressure boost; and
   maintaining the open position.

2. A method as recited in claim 1 wherein determining a potential boost pressure comprises determining the potential boost pressure when a variable vane position of a high pressure turbine is within a predetermined range of vane positions.

3. A method of controlling an engine comprising:
   opening a high pressure turbine bypass valve of a turbocharging system;
   for a first position of a variable geometry turbine of a high pressure turbocharger, determining a first predicted boost pressure when the high pressure turbine bypass valve is in an open position;
   for a second position of the variable geometry turbine, determining a second predicted boost pressure when the high pressure turbine bypass valve is in the open position;
   determining a desired boost; and
   when the desired boost is between the first predicted boost pressure and the second predicted boost pressure, closing the high pressure turbine bypass valve.

4. A method as recited in claim 3 wherein the first position of the variable geometry turbine corresponds to a minimum position and wherein the second position of the variable geometry turbine corresponds to a maximum position.

5. A method as recited in claim 3 wherein determining a first predicted boost pressure comprises determining the first predicted boost pressure based on a high pressure compressor pressure ratio and a low pressure compressor pressure ratio.

6. A method as recited in claim 5 further comprising determining the high pressure compressor pressure ratio based on a high pressure compressor map.

7. A method as recited in claim 5 further comprising determining the high pressure compressor pressure ratio based on a high pressure compressor map and a low pressure compressor outlet temperature.

8. A method as recited in claim 7 further comprising determining the low pressure compressor outlet temperature based on a low pressure inlet temperature, a low pressure compressor pressure ratio and a low pressure compressor efficiency.

9. A method as recited in claim 8 further comprising determining the low pressure compressor pressure ratio based on an energy to a low pressure compressor.

10. A method as recited in claim 3 wherein determining a first predicted boost pressure comprises determining a first predicted boost pressure based on a potential high pressure turbine energy.

11. A method as recited in claim 10 further comprising determining the potential high pressure turbine energy based on an exhaust temperature and a high pressure turbine pressure ratio.

12. A method as recited in claim 3 wherein determining a first predicted boost pressure comprises determining the first predicted boost pressure based on a potential low pressure turbine energy.

13. A method as recited in claim 12 further comprising determining the potential low pressure turbine energy based on an exhaust temperature and a low pressure turbine pressure ratio.

14. A method as recited in claim 3 wherein determining a first predicted boost pressure comprises determining the first predicted boost pressure based on a temperature drop over a high pressure turbine.

15. A method as recited in claim 14 wherein determining a temperature drop over the high pressure turbine comprises determining a pressure drop over the high pressure turbine based on a high pressure turbine efficiency, a high pressure turbine inlet temperature and a high pressure turbine pressure ratio.

16. A control system comprising:
a boost determination module that determines a first predicted boost pressure for a first position of a variable geometry turbine when a high pressure turbine bypass valve is in an open position, and that determines a second predicted boost pressure for a second position of the variable geometry turbine when the high pressure turbine bypass valve is in the open position;
a desired boost module that determines a desired boost;
a comparison module that determines when the desired boost is between the first predicted boost pressure and the second predicted boost pressure; and
a bypass valve control module that closes the high pressure turbine bypass valve when the desired boost is between the first predicted boost pressure and the second predicted boost pressure.

17. A control system as recited in claim 16 wherein the first predicted boost pressure is based on a potential low pressure turbine energy.

18. A control system as recited in claim 16 wherein the first predicted boost pressure is based on a high pressure compressor pressure ratio and a low pressure compressor pressure ratio.

19. A system comprising:
an engine;
a high pressure turbocharger having a high pressure variable geometry turbine and a high pressure compressor;
a low pressure turbocharger in series with the high pressure turbocharger having a low pressure turbine and a low pressure compressor; and
the high pressure turbine bypass valve bypassing the high pressure turbine;
the control system as recited in claim 16.

20. A system as recited in claim 19 wherein the first position of the variable geometry turbine corresponds to a minimum position and wherein the second position of the variable geometry turbine corresponds to a maximum position.

* * * * *